(12) United States Patent
Wang

(10) Patent No.: US 6,183,640 B1
(45) Date of Patent: Feb. 6, 2001

(54) HIGHLY ASYMMETRIC ANIONIC MEMBRANES

(75) Inventor: I-fan Wang, San Diego, CA (US)

(73) Assignee: USF Filtration and Separations Group, Inc., Timonium, MD (US)

( * ) Notice: Under 35 U.S.C. 154(b), the term of this patent shall be extended for 0 days.

(21) Appl. No.: 09/289,563

(22) Filed: Apr. 9, 1999

(51) Int. Cl.$^7$ .................................................... B01D 71/52
(52) U.S. Cl. .............................. 210/500.41; 210/500.35; 210/500.27; 210/638; 264/41; 427/244
(58) Field of Search ............................... 210/641, 500.41, 210/500.35, 638, 500.27; 264/41; 427/244

(56) References Cited

U.S. PATENT DOCUMENTS

| | | |
|---|---|---|
| 4,012,324 | 3/1977 | Gregor . |
| 4,382,123 * | 5/1983 | Kimoto et al. .......................... 521/27 |
| 4,673,504 | 6/1987 | Ostreicher et al. . |
| 4,774,039 | 9/1988 | Wrasidlo . |
| 4,797,187 | 1/1989 | Davis et al. . |
| 4,839,203 * | 6/1989 | Davis et al. .......................... 427/244 |
| 5,021,160 * | 6/1991 | Woldert ............................ 210/500.35 |
| 5,264,125 * | 11/1993 | MacDonald et al. ............ 210/500.35 |
| 5,462,866 * | 10/1995 | Wang .................................... 435/182 |
| 5,531,893 | 7/1996 | Hu et al. . |
| 5,562,871 * | 10/1996 | Hoyt et al. ............................ 264/130 |
| 5,906,742 * | 5/1999 | Wang et al. ...................... 210/500.41 |
| 5,932,519 * | 8/1999 | Landry-Coltrain et al. .......... 503/227 |

* cited by examiner

*Primary Examiner*—Ana Fortuna
(74) *Attorney, Agent, or Firm*—Knobbe, Martens, Olson, and Bear, LLP

(57) ABSTRACT

The present invention relates to anionically charge-modified membranes and methods of preparing such membranes. In one major aspect of the invention, the membranes are internally hydrophilic and formed from casting a film of a mixed polymer solution that includes an anionic agent.

70 Claims, 2 Drawing Sheets

HIGHLY ASYMMETRIC ANIONIC MEMBRANES

BACKGROUND OF THE INVENTION

1. Field of the Invention

The present invention relates to membranes having internal anionic charges and processes to prepare such membranes. The anionically charged membranes are produced from membrane casting processes incorporating anionic components.

2. Background of the Technology

Anionically charge-modified membranes are useful in the removal of a variety of materials from solutions and also in certain biotechnological applications. For example, negatively charged membranes are useful in the removal of endotoxins from solutions. Endotoxins are toxic substances often derived from bacterial lysates. In addition, such membranes have found utility in the removal of positively charged species from feed-streams, such as in the preparation of ultrapure water for the semiconductor industry.

Ultrafiltration and microfiltration membranes utilized in industry, particularly in the food processing industry and in environmental applications, are typically hydrophobic membranes which may be surface-modified with a hydrophilic material to reduce fouling and to confer additional desirable properties to the membrane. Membranes may be isotropic or asymmetric (anisotropic) in their pore structure. Isotropic membranes have a uniform pore structure throughout the membrane. Asymmetric membranes do not have a uniform pore structure throughout the membrane. Asymmetric porous membranes are distinguished from isotropic, homogeneous membrane structures whose flow and retention properties are independent of flow direction. Asymmetric membranes are useful in microfiltration, ultrafiltration, and reverse osmosis processes.

Several different processes and reagents have been utilized to produce charge-modified, initially hydrophilic or hydrophobic membranes, and related membranes.

U.S. Pat. No. 4,012,324 to Gregor discloses casting formulations including a matrix polymer, a polyelectrolyte, a solvent, and a chemical cross-linking agent. Membranes are formed therefrom through a process of evaporating the solvent to form a membrane of uniform porosity and macroscopic homogeneity, having fixed anionic or cationic charges and a water content of from about 15 to about 75%. Membranes with substantial equilibrium water content are known as hydrogels and are subject to loss of water unless protected prior to use and additionally have limited application.

U.S. Pat. No. 4,673,504 to Ostreicher, et al., discloses cationic charge-modified microporous membranes that are produced from hydrophilic organic polymeric microporous membranes. These microporous membranes are hydrophilic and isotropic, with uniform pore structure throughout the membrane. However, anisotropic hydrophilic membranes are not disclosed in the Ostreicher patent.

U.S. Pat. No. 4,797,187 to Davis, et al., discloses a method to prepare ionically bonded coacervate layer membranes having improved selectivity. The Davis membranes are composite semi-permeable membranes of the type useful for reverse osmosis, gas separation, and ultrafiltration, and are post-treated to improve their selectivity.

U.S. Pat. No. 5,531,893 to Hu, et al., discloses a hydrophilic charge-modified microporous membrane having a crosslinked structure of an interpenetrating polymer network. The membrane comprises a homogeneous matrix of polyethersulfone (PES), polyfunctional glycidyl ether, and a polymeric amine such as polyethyleneimine (PEI) and like polyamines, and polyethylene glycol. A shortcoming of the '893 patent is that membranes heated for the stabilization of the network structure have a lower cationic charge density. This is stated to be due to gradual decomposition of crosslinked PEI adduct in the membrane structure.

Thus, while it can be seen that various different processes and reagents have been utilized to produce charge-modified membranes, each of the cited references has one or more undesirable features. None of the cited references produces stable, anionically charge-modified, isotropic or anisotropic, optionally non-hydrogel membranes in a simple casting process without chemical crosslinking agents. Accordingly, there remains a need for improved, stable, anionically charged membranes which possess a plurality of fixed formal negative charges that can be readily produced from polymer starting materials in a casting process without complication or expensive apparatus and which are not restricted to isotropic or hydrogel membrane types.

SUMMARY OF THE INVENTION

The present invention provides polymer membrane having permanent internal anionic charges, cast from a solution or suspension including a sulfone polymer, an anionic charge-modifying agent, a nonsolvent, and a solvent. The membrane has a first surface and a second surface, each surface having pores thereon; the membrane also has a porous supporting structure between the first and second surface, wherein the porous supporting structure includes a reticulated network of flow channels between the pores of the first surface and the second surface. The sulfone polymer may be, for example, polysulfone, polyethersulfone, or polyarylsulfone. The anionic charge-modifying agent may be 2-acrylamido-2-methylpropane sulfonic acid or 1-propanesulfonic acid 2-methyl-2-(1-oxy-2-propenyl amino). The nonsolvent may be, for example, low molecular weight organic acids, alcohols, ethers, surfactants, or water, including t-amyl alcohol, methoxyethanol, and propionic acid. The solvent may be N-methylpyrrolidone, and the casting solution or suspension may further include a crosslinking initiator.

The membrane of this aspect of the invention, may be an ultrafiltration membrane, and may have a molecular weight exclusion cutoff of about 10 kDa or about 100 kDa. Likewise, the membrane may be a microfilter, and may have a mean flow pore size of less than about 0.1 micron, about 0.2 micron, or about 0.3 to about 1.0 micron. The membrane may be asymmetric, and the pores of the first surface may be at least about 5 times smaller than the pores at the second surface. The flow channels of the porous supporting structure may gradually increase in diameter from the first surface to the second surface.

In another aspect, the invention provides a method of forming a polymer membrane having permanent internal anionic charges. The method includes: providing a casting solution or suspension including a sulfone polymer, an anionic charge-modifying agent, a nonsolvent, and a solvent; casting the solution or suspension to form a thin film; coagulating the film in a quench bath; and recovering a polymer membrane having permanent internal anionic charges, the membrane having a first surface and a second surface, each surface having pores thereon, the membrane also having a porous supporting structure between the first and second surface, wherein the porous supporting structure includes a reticulated network of flow channels between the pores of the first surface and the second surface. The sulfone polymer used in the method may be, for example, polysulfone, polyethersulfone, and polyarylsulfone. The anionic charge-modifying agent may be, for example, 2-acrylamido-2-methylpropane sulfonic acid or 1-propanesulfonic acid 2-methyl-2-(1-oxy-2-propenyl amino). The nonsolvent may include, for example, low molecular weight organic acids, alcohols, ethers, surfactants, or water, such as t-amyl alcohol, methoxyethanol, or propionic acid. The solvent may be N-methylpyrrolidone and the casting solution or suspension may further include a crosslinking initiator. The method of the invention may further include the additional step of heat crosslinking the membrane. The heat crosslinking step may occur at a temperature between 100° C. and 130° C.

The method of the invention may be used to produce an ultrafiltration membrane, which may have a molecular weight exclusion cutoff of about 10 kDa, or about 100 kDa. The membrane may be a microfilter, and may have a mean flow pore size of less than about 0.1 micron, about 0.2 micron, or about 0.3 to about 1.0 micron. The membrane produced by the method may be asymmetric, and the pores of the first surface may be at least about 5 times smaller than the pores at the second surface. The flow channels of the porous supporting structure may gradually increase in diameter from first surface to the second surface.

DETAILED DESCRIPTION OF THE INVENTION

Figure 1:
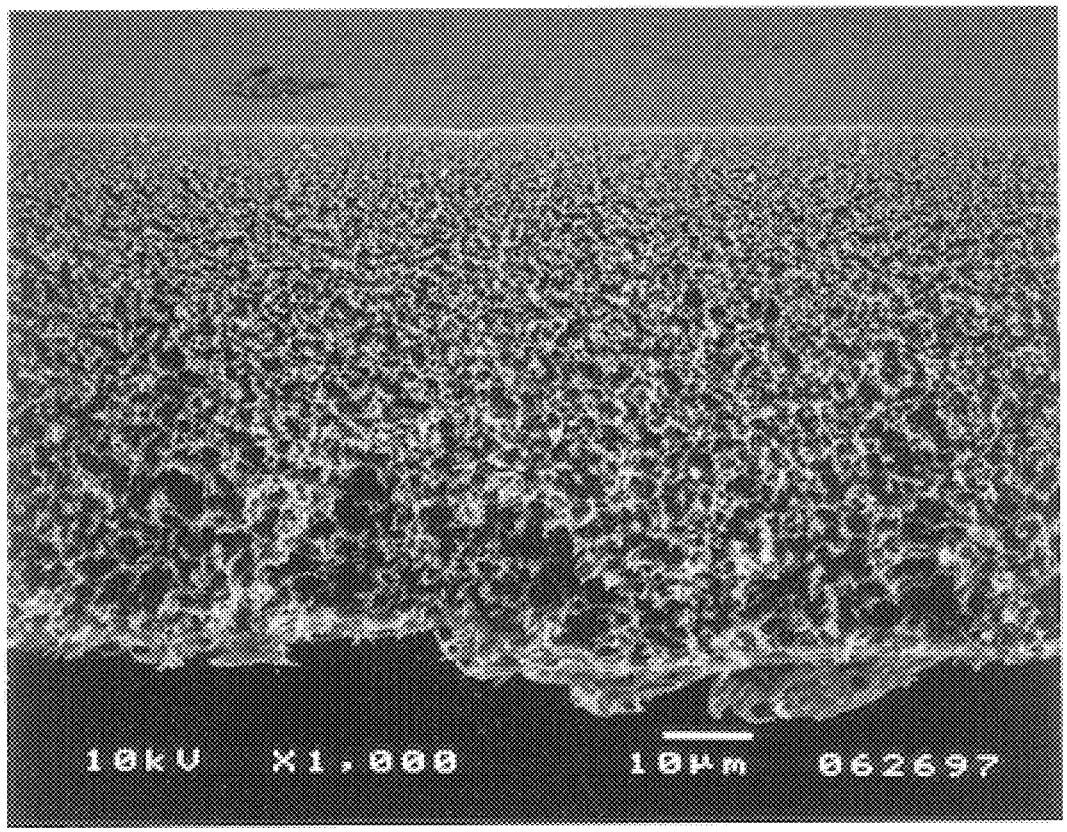
FIG. 1 is a scanning electron micrograph of a cross section of the ultrafiltration membrane of Example 3.

The present invention relates to internally anionic filtration membranes and their method of manufacture. In general, highly asymmetric, internally anionic membranes may be produced by blending an anionically charged hydrophilic polymer or monomer with other polymeric membrane components to form a composition that is either a homogenous solution or a colloidal suspension. This composition then may be cast and phase separated into a solid form. Following the phase separation, the membrane may be heat crosslinked to form an irreversibly polymerized, internally anionic membrane. These membranes have a highly asymmetric pore structure in cross section, and include a skin and a porous asymmetric support having a gradient of pore sizes. The term "skin" as used herein denotes a membrane surface having pores that are the smallest, or among the smallest, to be found in the membrane. This usage is in contrast to the conventional usage of the term "skin" in the art of gas separation type membranes, wherein the skin is often a nearly impermeable layer having no pores, or pores of vanishingly small size.

The membranes of the invention are internally hydrophilic, such that the negative charge is disposed on the internal faces of the pores. This contrasts with previous anionic membranes that are produced through post-casting treatments, such as sulfonation. Although post-casting sulfonation is known to convert an uncharged membrane into a charged membrane, it also suffers from several drawbacks. For example, the sulfonation process does not reliably produce charged membranes when the pore size is very small. In addition, post-casting sulfonation of a membrane reduces the life span of the membrane, leading to higher cost of membrane use.

The membranes of the invention are useful in a variety of applications in industrial waste treatment, oil waste water treatment, acid amine water, or filtration of metal ion feed streams, by either dead end or crossflow filtration. The present invention has a much higher water flow rate, excellent retention properties of various metal salts, and also has outstanding non-fouling characteristic due to the surface charges. These charged membranes have shown promising results in several areas such as selective recovery of solutes, industrial water reuse operations, metal plating rinse water recovery, hardness reduction, reuse of scrubber and mine water, processing of solutions containing high suspended solids, and the like.

In one embodiment of the invention, it has been discovered that sufficient irreversible anionic charge modification of a membrane produced by casting a polymer blend can be achieved without employing a chemically-induced crosslinking process. The avoidance of chemical crosslinking agents in the aforementioned membrane manufacturing process is desirable from the environmental perspective to reduce the use of hazardous materials and production of hazardous waste. Additionally, it is known that unreacted chemical crosslinking agents in a finished membrane can cause membrane performance problems. A simple thermal-induced crosslinking of the anionic charge-modifying polymer with itself and the other components of the polymer blend can be employed to produce an irreversibly anionically charged membrane. Such anionic membranes were found to exhibit highly efficient cationic dye retention.

Membranes of the present invention are useful in a variety of filtration applications, including the filtration of water and other fluids for electronics, pharmaceuticals, and biologics, as well as for endotoxin removal from secondary metabolite streams and blood filtration (including separation of leukocytes, lymphocytes, platelets, and the like).

Aspects of the invention provide an internally anionically charge-modified membrane and a process to prepare such a membrane. Membranes can be prepared by casting a film with a mixed polymer solution or suspension containing a hydrophobic polymer, an anionic agent, a non-solvent and an organic solvent. The film is quenched in an aqueous bath after formation, and the resulting membrane is washed and dried. Conventional film casting, quenching, rinsing and drying procedures may be employed.

Membranes of the invention may have an asymmetric or highly asymmetric cross sectional structure. A typical membrane having an asymmetric structure may have one surface with minimum (smallest or nearly smallest) pores, an opposite surface with larger pores, and a gradient of pores in the thickness between the surfaces, such that the pore size gradually increases from the skin face to the opposite face. In such a membrane, the asymmetry is quantified by comparing the diameter of the pores on the opposite face to the diameter of pores on the skin face. Asymmetric membranes may have a pore size ratio of about 2:1 to about 9:1. Highly asymmetric membranes may have pore size ratios of about 10:1, 100:1, 1,000:1, 10,000:1 or greater. In addition, still other membranes can have structures that combine asymmetric and isotropic regions. For example, a membrane may be isotropic through part of its thickness, then gradually or abruptly asymmetric throughout the remained of its thickness. Both isotropic and asymmetric membranes can be prepared to have a wide range of pore sizes and distributions. For example, the membranes can be prepared to be microfiltration membranes or ultrafiltration membranes. Ultrafiltration membranes are typically categorized in terms of molecular weight exclusion cutoff values, which may be determined based on the efficiency of retention by the membrane of substances having a known molecular weight, such as, for example, polysaccharides or proteins. The ultrafilters of the invention may have molecular weight cutoff values of, for example, about 10 kDa or less, 30 kDa, 50 kDa, 100 kDa, or higher.

Microfiltration membranes may be categorized based on the size of the limiting pores of the membranes. Depending on the structure of the membranes, the limiting pores may be at one surface thereof, in which case they may be referred to as "skin" pores. Alternatively, the limiting pores may be within the membrane, either just beneath one surface or deeper in the internal membrane structure. When the limiting pores are not at the surface, it is difficult to visually measure their size using microscopy. In such cases, mean flow pore size may be determined by porometric tests as described herein. Accordingly, microfiltration membranes of the invention may have limiting pores or mean flow pore sizes of, for example, about 0.03 micron or less, 0.1 micron, 0.2 micron, 0.5 micron, 1.0 micron, 2.0 micron, and larger.

In a preferred embodiment, the hydrophobic polymer is a sulfone polymer and may be selected from compounds such as polysulfone, polyarylsulfone and polyethersulfone, with polyethersulfone being most preferred. Generally, a concentration between about 5% and about 50% by weight of the hydrophobic sulfone polymer may be employed in the membrane dope mix. Preferably, a concentration between about 8% and about 25% by weight is employed. Most preferably, a concentration of about 9–18% by weight of a sulfone polymer is employed.

The anionic agent can be any hydrophilic polymer or monomer containing a negative charge. For example, homopolymers of 2-acrylamido-2-methylpropane sulfonic acid, or 1-propanesulfonic acid 2-methyl-2-(1-oxy-2-propenyl amino) (AMPS) are preferred anionic agents. The concentration of the anionic agent may range from 0.1% to 10%, preferably from 0.2% to 6%, and more preferably from 0.4% to 4%.

The organic solvent used to produce the internally anionic membranes can be any solvent useful for dissolving the polymer. Preferred solvents are N-methylpyrrolidone (NMP) or dimethylformamide (DMF). Other suitable solvents include, but are not limited to, dimethylacetamide, dioxane, dimethylsulfoxide, chloroform, and tetrachloroethane propionic acid and tetrahydrofuran. Generally, a concentration between about 10% to 80% by weight of solvent may be employed in the polymer solution. Ranges of about 20% to 70% by weight, 30% to 60% by weight, and 40% to 50% by weight are particularly useful.

The non-solvent in the polymer mix is preferably one or more of: a low molecular weight organic acid, an alcohol, an ether, a surfactant, or water. Suitable examples of nonsolvents or pore formers include, but are not limited to, formic, acetic, propionic and butyric acid with propionic acid being most preferred, 2-methoxyethanol, t-amyl alcohol, 1-butanol, methanol, ethanol, isopropanol, hexanol, heptanol, octanol, acetone, methylethylketone, methylisobutylketone, butyl ether, ethyl acetate, amyl acetate, glycerol, diethyleneglycol, di(ethyleneglycol) diethylether, di(ethyleneglycol)dibutylether, surfactants such as TWEEN 20, 40, 60, 80, and water. Concentration of the non-solvent may range from about 10% or less to about 75% or more. In certain embodiments and formulations, a preferred concentration range is about 60% to 70%, while in other embodiments and formulations, a preferred concentration range is about 10% to 20%. In still other embodiments, the preferred concentration range is about 30% to 40%.

EXAMPLES

The following examples are provided to illustrate the present invention. However, such examples are merely illustrative and are not intended to limit the subject matter of the invention. All chemical concentration percentages are w/v % unless otherwise indicated.

Example 1

A casting solution was prepared containing, by weight, 9.4% of polyethersulfone (Ultrasone E, 6020P available from BASF, Bridgeport, N.J.), 0.4% of the homopolymer 2-acrylamido-2-methylpropane sulfonic acid, 1.4% water, 65% of methoxyethanol and 23.8% of N-methylpyrrolidone (NMP) as the solvent. Membrane samples were cast onto a moving belt of polyethylene-coated paper using a casting knife with a knife gap of 16 mils (425 $\mu$m). After casting, the membranes were exposed to air for less than one second and thereafter quenched in a 25° C. water bath.

After coagulation in the water bath, the membranes were washed with deionized water and then air dried. The membranes thus formed were internally hydrophilic, as demonstrated by the complete wetting of the membranes within a few seconds of contact with water. The membranes were tested for water permeability and cationic dye retention at 6 psi (about 41.2 kPa) on a 25 mm diameter disk Amicon stirred cell (approximately 3.8 cm$^2$ effective filtering area). Membrane cross-sections showed asymmetric membrane structure. The membrane thus formed was found to retain more than 99.9% of a cationic methylene blue dye (10 ppm) from more than 20 mls of a filtered cationic dye solution.

Example 2

A casting solution is prepared as in Example 1, substituting polysulfone (Udel-3500, AMOCO, Alpharetta, Ga.), 1-propanesulfonic acid 2-methyl-2-(1-oxo-2-propenyl amino) (AMPS, LUBRIZOL Co., Wickliffe, Ohio), water, DMF, t-amyl alcohol and a cross-linking initiator (e.g. $Na_2S_2O_8$, Redox system) for the components used in the previous Example. Membrane samples are cast, air exposed, and quenched as in Example 1, except that the quench bath temperature is about 30° C.

After coagulation, the membranes are washed with deionized water and then heat crosslinked at 100° C. to 130° C. for 5 minutes. The membranes thus formed are found to be hydrophilic. Each membrane is tested for water permeability and cationic dye retention as in Example 1. The membrane has an asymmetric membrane structure. The membrane retains more than 99.9% of a 20 ml sample of 10 ppm methylene blue dye solution.

Example 3

Ultrafiltration membranes prepared from 16% polyethersulfone, 0.6% of a homopolymer of 2-acrylamido-2-methylpropane sulfonic acid in an aqueous solution containing 14% solid, 46.4% NMP, and 37% propionic acid were cast and air exposed as in Example 1, and then were quenched in a water bath at about 25° C. or 40° C.

After coagulation, the membranes were washed with deionized water and then air dried. The membranes thus formed were hydrophilic. Each membrane was tested for water permeability and cationic dye retention at 10 psi (about 68.7 kPa). The membranes displayed an asymmetric structure, as shown in FIG. 1. The membrane retained more than 99.9% of a 20 ml sample of 10 ppm methylene blue dye solution. Membranes that were quenched in a 25° C. water bath had an immunoglobulin G (IgG, ~160 kDa) retention of 98.9% and a bovine serum albumin (BSA, ~67 kDa) retention of 94%. Membranes that were quenched in a 40° C. water bath had an IgG retention of 96.2%.

Example 4

A microfiltration membrane was prepared from 11% polyethersulfone, 2% of the homopolymer 2-acrylamido-2-methylpropane sulfonic acid in an aqueous solution containing 14% solid, 71.6% DMF, and 15.4% t-amyl alcohol. The resulting solution was cast as in Example 1. Following casting, the membranes were exposed to air for three seconds and were quenched in a water bath at about 40° C.

Figure 2:
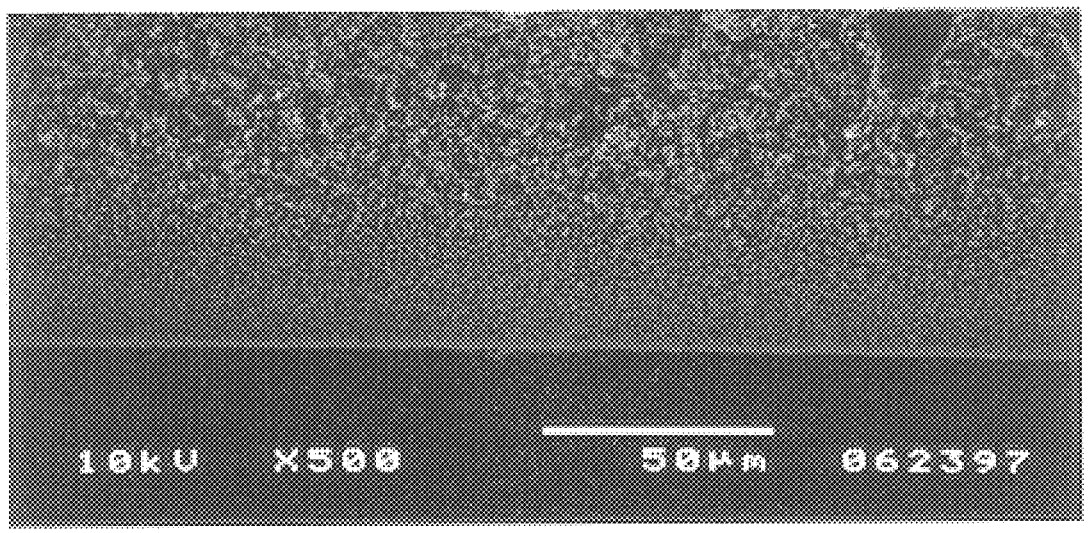
FIG. 2 is a scanning electron micrograph of a cross section of the microfiltration membrane of Example 4.

After coagulation, the membranes were washed with deionized water and air dried. The membranes thus formed were hydrophilic. Each membrane was tested for water permeability and cationic dye retention at 10 psi (68.7 kPa). The membranes had an asymmetric structure, as shown in FIG. 2. The membranes efficiently retained cationic dye from more than 20 ml of solution.

Example 5

A microfiltration membrane was prepared from 11% polyethersulfone, 4% of the homopolymer 2-acrylamido-2-methylpropane sulfonic acid (in an aqueous solution that contained 14% solid), 73% DMF, and 12% t-amyl alcohol and were cast, air exposed, and quenched as in Example 4.

After coagulation, the membranes were washed with deionized water and then air dried. The membranes thus formed were hydrophilic and had the same dye retention properties as Example 4.

Effect of Polymer Concentration:

Of the membranes described in the Examples, those with relatively higher concentrations of the main polymer typically have a smaller pore size. Although the concentrations of solvent and nonsolvent are not identical for the membranes of the Examples, a comparison of the described properties of the membranes supports the general principle that, other factors being held constant, a higher polymer concentration leads to a membrane with smaller pores.

Effect of Quench Temperature:

The quench temperature can also have a significant effect on the morphology of the membrane. A comparison of the membranes produced in Example 3 is instructive. Both membranes were cast from dope mixes that had identical components and formulation ratios of polymer, nonsolvent, and solvent. The difference in the way these membranes were prepared is in the quench temperature, which was 25° C. for one (IgG retention efficiency 98.9) and 40° C. for another (IgG retention efficiency 96.2). This comparison is consistent with the general rule that, other factors being held constant, a higher quench temperature results in more open pores, and often a larger MW cutoff value.

EQUIVALENTS

While the invention has been described in connection with specific embodiments thereof, it will be understood that it is capable of further modification, and this application is intended to cover any variations, uses, or adaptations of the invention following, in general, the principles of the invention and including such departures from the present invention as would be understood to those in the art as equivalent and the scope and context of the present invention is to be interpreted as including such equivalents and construed in accordance with the claims appended hereto.

What is claimed is:

1. A polymer membrane having permanent internal anionic charges, cast from a solution or suspension comprising a sulfone polymer, an anionic charge-modifying agent, a nonsolvent, and a solvent, the membrane having a first surface and a second surface, each surface having pores thereon, the membrane also having a porous supporting structure between the first and second surface, wherein the porous supporting structure comprises a reticulated network of flow channels between the pores of the first surface and the second surface, wherein the anionic charge-modifying agent comprises 2-acrylamido-2-methylpropane sulfonic acid or 1-propanesulfonic acid 2-methyl-2-(1-oxy-2-propenyl amino.

2. The membrane of claim 1, wherein the sulfone polymer is selected from the group consisting of polysulfone, polyethersulfone, and polyarylsulfone.

3. The membrane of claim 1 wherein the sulfone polymer is polyethersulfone.

4. The membrane of claim 1, wherein the nonsolvent is selected from the group consisting of low molecular weight organic acids, alcohols, ethers, surfactants, and water.

5. The membrane of claim 1, wherein the nonsolvent is t-amyl alcohol, methoxyethanol, propionic acid, or water.

6. The membrane of claim 1, wherein the solvent is N-methylpyrrolidone.

7. The membrane of claim 1, wherein the casting solution or suspension further comprises a cross-linking initiator.

8. The membrane of claim 1, wherein the membrane is an ultrafiltration membrane.

9. The membrane of claim 8, having a molecular weight exclusion cutoff of about 10 kDa.

10. The membrane of claim 8, having a molecular weight exclusion cutoff of about 100 kDa.

11. The membrane of claim 1, wherein the membrane is a microfilter.

12. The membrane of claim 11, having a mean flow pore size of less than about 0.1 micron.

13. The membrane of claim 11, having a mean flow pore size of about 0.2 micron.

14. The membrane of claim 11, having a mean flow pore size of about 0.3 to about 1.0 micron.

15. The membrane of claim 1, wherein the membrane is asymmetric.

16. The membrane of claim 15, wherein the pores of the first surface are at least about 5 times smaller than the pores at the second surface.

17. The membrane of claim 15, wherein the flow channels of the porous supporting structure gradually increase in diameter from the first surface to the second surface.

18. A method of forming a polymer membrane having permanent internal anionic charges, the method comprising:
   providing a casting solution or suspension comprising a sulfone polymer, an anionic charge-modifying agent, a nonsolvent, and a solvent, wherein the anionic charge-modifying agent comprises 2-acrylamido-2-methylpropane sulfonic acid or 1-propanesulfonic acid 2methyl-2-(1-oxy-2-propenyl amino);
   casting the solution or suspension to form a thin film;
   coagulating the film in a quench bath; and
   recovering a polymer membrane having permanent internal anionic charges, the membrane having a first surface and a second surface, each surface having pores thereon, the membrane also having a porous supporting structure between the first and second surface, wherein the porous supporting structure comprises a reticulated network of flow channels between the pores of the first surface and the second surface.

19. The method of claim 18, wherein the sulfone polymer is selected from the group consisting of polysulfone, polyethersulfone, and polyarylsulfone.

20. The method of claim 18, wherein the sulfone polymer is polyethersulfone.

21. The method of claim 18, wherein the nonsolvent is selected from the group consisting of low molecular weight organic acids, alcohols, ethers, surfactants, and water.

22. The method of claim 18, wherein the nonsolvent is t-amyl alcohol, methoxyethanol, propionic acid, or water.

23. The method of claim 18, wherein the solvent is N-methylpyrrolidone.

24. The method of claim 18, wherein the casting solution or suspension further comprises a cross-linking initiator.

25. The method of claim 18, further comprising the additional step of heat crosslinking the membrane.

26. The method of claim 25, wherein the heat crosslinking step occurs at a temperature between 100° C. and 130° C.

27. The method of claim 18, wherein the membrane is an ultrafiltration membrane.

28. The method of claim 27, having a molecular weight exclusion cutoff of about 10 kDa.

29. The method of claim 27, having a molecular weight exclusion cutoff of about 100 kDa.

30. The method of claim 18, wherein the membrane is a microfilter.

31. The method of claim 30, having a mean flow pore size of less than about 0.1 micron.

32. The method of claim 30, having a mean flow pore size of about 0.2 micron.

33. The method of claim 30, having a mean flow pore size of about 0.3 to about 1.0 micron.

34. The method of claim 18, wherein the membrane is asymmetric.

35. The method of claim 34, wherein the flow channels of the porous supporting structure gradually increase in diameter from the first surface to the second surface.

36. The method of claim 34, wherein the pores of the first surface are at least about 5 times smaller than the pores at the second surface.

37. A polymer membrane having permanent internal anionic charges, cast from a solution or suspension comprising a sulfone polymer, an anionic charge-modifying agent, a nonsolvent, and a solvent, the membrane having a first surface and a second surface, each surface having pores thereon, the membrane also having a porous supporting structure between the first and second surface, wherein the porous supporting structure comprises a reticulated network of flow channels between the pores of the first surface and the second surface, wherein the membrane is asymmetric, and wherein the pores of the first surface are at least about 5 times smaller than the pores at the second surface.

38. The membrane of claim 37, wherein the sulfone polymer is selected from the group consisting of polysulfone, polyethersulfone, and polyarylsulfone.

39. The membrane of claim 37, wherein the sulfone polymer is polyethersulfone.

40. The membrane of claim 37, wherein the anionic charge-modifying agent comprises 2-acrylamido-2-methylpropane sulfonic acid or 1-propanesulfonic acid 2-methyl-2-(1-oxy-2-propenyl amino).

41. The membrane of claim 37, wherein the nonsolvent is selected from the group consisting of low molecular weight organic acids, alcohols, ethers, surfactants, and water.

42. The membrane of claim 37, wherein the nonsolvent is t-amyl alcohol, methoxyethanol, propionic acid, or water.

43. The membrane of claim 37, wherein the solvent is N-methylpyrrolidone.

44. The membrane of claim 37, wherein the casting solution or suspension further comprises a cross-linking initiator.

45. The membrane of claim 37, wherein the membrane is an ultrafiltration membrane.

46. The membrane of claim 45, having a molecular weight exclusion cutoff of about 10 kDa.

47. The membrane of claim 45, having a molecular weight exclusion cutoff of about 100 kDa.

48. The membrane of claim 37, wherein the membrane is a microfilter.

49. The membrane of claim 48, having a mean flow pore size of less than about 0.1 micron.

50. The membrane of claim 48, having a mean flow pore size of about 0.2 micron.

51. The membrane of claim 37, having a mean flow pore size of about 0.3 to about 1.0 micron.

52. The membrane of claim 37, wherein the flow channels of the porous supporting structure gradually increase in diameter from the first surface to the second surface.

53. A method of forming a polymer membrane having permanent internal anionic charges, the method comprising:
    providing a casting solution or suspension comprising a sulfone polymer, an anionic charge-modifying agent, a nonsolvent, and a solvent;
    casting the solution or suspension to form a thin film;
    coagulating the film in a quench bath; and
    recovering a polymer membrane having permanent internal anionic charges, the membrane having a first surface and a second surface, each surface having pores thereon, the membrane also having a porous supporting structure between the first and second surface, wherein the porous supporting structure comprises a reticulated network of flow channels between the pores of the first surface and the second surface, wherein the membrane is asymmetric, and wherein the pores of the first surface are at least about 5 times smaller than the pores at the second surface.

54. The method of claim 53, wherein the sulfone polymer is selected from the group consisting of polysulfone, polyethersulfone, and polyarylsulfone.

55. The method of claim 53, wherein the sulfone polymer is polyethersulfone.

56. The method of claim 53, wherein the anionic charge-modifying agent comprises 2-acrylamido-2-methylpropane sulfonic acid or 1-propanesulfonic acid 2-methyl-2-(1-oxy-2-propenyl amino).

57. The method of claim 53, wherein the nonsolvent is selected from the group consisting of low molecular weight organic acids, alcohols, ethers, surfactants, and water.

58. The method of claim 53, wherein the nonsolvent is t-amyl alcohol, methoxyethanol, propionic acid, or water.

59. The method of claim 53, wherein the solvent is N-methylpyrrolidone.

60. The method of claim 53, wherein the casting solution or suspension further comprises a cross-linking initiator.

61. The method of claim 53, further comprising the additional step of heat crosslinking the membrane.

62. The method of claim 61, wherein the heat crosslinking step occurs at a temperature between 100° C. and 130° C.

63. The method of claim 53, wherein the membrane is an ultrafiltration membrane.

64. The method of claim 63, having a molecular weight exclusion cutoff of about 10 kDa.

65. The method of claim 63, having a molecular weight exclusion cutoff of about 100 kDa.

66. The method of claim 53, wherein the membrane is a microfilter.

67. The method of claim 66, having a mean flow pore size of about 0.2 micron.

68. The method of claim 66, having a mean flow pore size of about 0.3 to about 1.0 micron.

69. The method of claim 66, having a mean flow pore size of less than about 0.1 micron.

70. The method of claim 53, wherein the flow channels of the porous supporting structure gradually increase in diameter from the first surface to the second surface.

* * * * *